United States Patent
Franceschini et al.

(10) Patent No.: US 7,667,859 B2
(45) Date of Patent: Feb. 23, 2010

(54) METHOD AND DEVICE FOR HYPERACUTE DETECTION OF AN ESSENTIALLY RECTILINEAR CONTRAST EDGE AND SYSTEM FOR FINE FOLLOWING AND FIXING OF SAID CONTRAST EDGE

(75) Inventors: Nicolas Franceschini, Marseilles (FR); Stephane Viollet, Marseilles (FR); Marc Boyron, Marseilles (FR)

(73) Assignee: Centre National de la Recherche Scientifique (C.N.R.S.), Paris (FR)

( * ) Notice: Subject to any disclaimer, the term of this patent is extended or adjusted under 35 U.S.C. 154(b) by 298 days.

(21) Appl. No.: 11/587,163

(22) PCT Filed: Mar. 16, 2005

(86) PCT No.: PCT/FR2005/000643

§ 371 (c)(1),
(2), (4) Date: Apr. 20, 2007

(87) PCT Pub. No.: WO2005/111536

PCT Pub. Date: Nov. 24, 2005

(65) Prior Publication Data
US 2007/0216910 A1  Sep. 20, 2007

(30) Foreign Application Priority Data
Apr. 23, 2004 (FR) .................................. 04 04352

(51) Int. Cl.
*G01B 11/28* (2006.01)
(52) U.S. Cl. .................................................... 356/629
(58) Field of Classification Search ... 356/237.1–237.5, 356/629; 702/159, 172; 318/568.11; 369/44.11, 369/44.14
See application file for complete search history.

(56) References Cited

U.S. PATENT DOCUMENTS 3,444,544 A * 5/1969 Busch et al. ................. 340/506
3,507,991 A * 4/1970 Scotchie et al. ............. 348/169

OTHER PUBLICATIONS

Viollet S et al:, "Visual Servo System Based on a Biologically Inspired Scanning Sensor", Proceedings of the SPIE—The Internationa Society for Optical Engineering SPIE-Int. Soc. Opt. Eng USA, vol. 3839, Sep. 19, 1999, pp. 144-155, XP002312064, ISSN: 0277-786X, the Whole Document.

(Continued)

*Primary Examiner*—Tarifur R. Chowdhury
*Assistant Examiner*—Isiaka O Akanbi
(74) *Attorney, Agent, or Firm*—Young & Thompson

(57) ABSTRACT

Method and device for the detection of an essentially rectilinear contrast edge (E) in a direction, whereby a periodic sweep ($\Omega$) of global visual angle ($\Delta\psi$) of the optical sensors, by translation (S) in another direction transverse to the first direction, is carried out. The translation provides a periodic sweep of non-uniform angular speed ($\dot{\psi}$) during a part of the period of sweeping and a measurement of a time difference (t) from the signals provided by the sensors (D1, D2), depending on the angular position of the contrast edge (E) with relation to a reference direction (OY12) within the global visual angle ($\Delta\psi$) from the sweep law ($\Omega$), the reference direction being connected to a specific value for the time difference (t). The above is of application to spatial stabilization of a sight line and the fine following and fixing of an object with at least one contrast edge.

16 Claims, 8 Drawing Sheets

OTHER PUBLICATIONS

Viollet S et al:, "Super-Accurate Visual Control of an Aerial Minirobot", Autonomous Minirobots for Research and Edutainment. AMIRE2001. Proceedings of the 5$^{TH}$ Heinz Nixdorf Symposiu Heinz Nixdorf Inst., Univ. Paderborn Paderborn, Grmany., Oct. 22, 2001- Oct. 25, 2001, pp. 215-224, XP001152416, ISBN: 3-935433-06-9, the Whole Document.

* cited by examiner

METHOD AND DEVICE FOR HYPERACUTE DETECTION OF AN ESSENTIALLY RECTILINEAR CONTRAST EDGE AND SYSTEM FOR FINE FOLLOWING AND FIXING OF SAID CONTRAST EDGE

BACKGROUND OF THE INVENTION

1. Field of the Invention

The invention relates to a method and a device for hyperacuity-type optical detection of a substantially rectilinear contrast edge and to a system for acquiring and tracking a target comprising at least one such contrast edge.

2. Description of the Related Art

In the technical field of imaging, a solution for obtaining a very high resolution image sensor involves associating a sensor having a high density of pixels with a suitable optical system. In addition to significant bulk, this solution is very expensive.

Another solution involves moving an image sensor by displacement micro-steps, which are sub-multiples of the spacing between the pixels thereof, and reconstituting a final image on the basis of the partial images acquired during each micro-displacement. A solution of this type involves the use of a large-capacity storage memory as well as an image reconstruction algorithm which is particularly powerful and therefore expensive in time and computer resources.

In the corresponding technical field relating to detection of the horizon for automatic steering and stabilization of a ship or an aircraft, optical detection procedures have been proposed in addition to procedures employing inertial systems. The aforementioned optical detection procedures basically consist in measuring a difference in the intensity of infrared and/or visible radiation between the sky and the ground.

Other experimental systems have also been proposed. This type of system employs a CCD sensor and an image-processing algorithm, in order to extract the horizon therefrom with appropriate accuracy. However, a system of this type necessitates high luminance and a considerable processing power.

Detection by electromagnetic waves or radar waves is employed for detecting obstacles as steel cables and small-sized objects at a relatively great distance.

Radar systems with millimeter waves are capable of detecting a 6 mm diameter steel cable at a distance of about 25 m, and ultrabroadband radar systems are capable of detecting a steel cable of the same diameter at a distance of about 80 m.

In the same field a cable having a comparable diameter can be detected up to a distance limited to 6 m, however, by procedures employing a scanning laser. The corresponding scanning laser-type detectors are voluminous, bulky and heavy, weighing from 6 to 8 kg.

More recently, a detection procedure using an electronic eye subjected to micro-scanning, which rotates relative to a substantially rectilinear contrast edge was described by Stéphane Viollet and Nicolas Franceschini, Equipe Microrobotique UMR Mouvement et Perception, CNRS/Université de la Méditerrannée 31, Chemin Joseph Aiguier 13402 Marseille Cedex 20, during the fifth workshops of the microrobotic pole and first workshops of the microrobotic RTP held on 6 and 7 Nov. 2002 in Rennes, Irisa and ENS Cachan, Antenne de Bretagne, France.

The published article which resulted from these workshops and is designated $A_1$, describes the design and production of a specific type of visual sensor known as a "neuromimetic" visual sensor, the operating laws of which are directly inspired from the living world. This sensor, known as OSCAR, for optical scanner for the control of autonomous robots, enables the angular position of a contrast having a substantially rectilinear edge to be determined by means of two spatially offset photodiodes, on which is imposed periodic rotational microscanning inspired by observations of the retina of a fly in flight.

Measurement of the relative movement of the visual environment, in other words of the substantially rectilinear edge, is carried out using an elementary movement detector (EDM) circuit, of which the use and operating law is inspired from that of fly movement detecting neurons.

For rotational scanning at variable speed, the signal delivered by the EMD circuit from the two photodiodes is a signal of which the amplitude depends on the angular position of the contrast edge relative to the average direction of the total field of vision of the sensor formed by the two photodiodes.

For a more comprehensive description of this OSCAR sensor, reference should be made to the published article $A_1$ relating to these two workshops.

With reference to this article, it is mentioned that this OSCAR sensor allows the production, in particular, of:

much finer acuity than the angle $\Delta\phi$ separating the visual axes, which are the axes of maximum sensitivity of the two photodiodes, defining the total angle of vision of the sensor, such a sensor reacting to a rotation of as little as 2.5% of the angle $\Delta\phi$;

a visible minimum which is much finer than this angle $\Delta\phi$, a sensor of this type easily detecting a 1 cm wide black bar at a distance of 200 cm, this bar subtending an angle of only 0.28°, that is an angle representing 7.8% of this total angle of vision $\Delta\phi$.

A sensor of this type has adequate visual acuity ability to allow the integration thereof in a visuo-motor servo control loop, the static gain of the sensor also varying minimally according to the nature of the object, its contrast or its distance.

SUMMARY OF THE INVENTION

The present invention relates to the implementation of a method and a device for hyperacuity-type detection of a substantially rectilinear contrast edge, which are based on a similar law but by means of which the bulk and also the mass, inertia and the consumed power of the detection device are substantially reduced in comparison with the OSCAR sensor of the prior art, and which enables the reliability, in the sense of the repeatability of the scanning operation, of the hyperacuity-type detection device according to the invention to be improved in a particularly significant manner.

The present invention also relates to the implementation of a system for the fixing and fine tracking of a target comprising at least one contrast edge, having a substantially rectilinear light transition zone for monitoring and stabilizing the sighting direction of a hyperacuity-type detection device according to the subject of the invention, the capability of this system being comparable, at least qualitatively, to that of the VOR (vestibulo ocular reflex) process, which is known to stabilize the eye and therefore the human line of sight, owing to the combination, on the one hand, of the hyperacuity type detection method according to the invention and, on the other hand, of particularly rapid control inspired by the aforementioned VOR process.

The present invention finally relates to any application of the method and the device for detecting a contrast edge according to the invention and of the system for fixing and fine tracking of a target, in particular, horizon detection and location to stabilize an aircraft, a spacecraft, a marine craft or an aerial appliance;

detection of cables, posts, rails and other thin or filiform obstacles by an aircraft or other vehicle;

aid to the stabilization and/or navigation of a flying machine such as a steered or remotely steered helicopter in a confined area;

aid to the maintenance to high-voltage electric lines, telephone lines or the like, by use on an aerial or other appliance steered or remotely steered by a high-precision, high-stability visuo-motor loop;

stabilization, by optical detection, of an aircraft which is in free flight or is captive relative to a stationary target placed on the ground;

stabilization of a platform relative to fixed optical markers (instrument or machine supports, marine platform or the like);

stabilization of an image sensor (camera, device for taking photographs);

high-precision differential micro-positioning of objects having one or two-dimensional contrast such as optical masks, for the detection of micro-defects or the like;

a passive theodolite for a very remote contrast structure;

long-distance detection of very-low-amplitude movement, in particular of intruders entering a protected enclosure;

optical tracking of agents (aircraft, birds, etc.) by a camera or device for taking photographs;

aid to navigation by detection of obstacles close to the direction of displacement, in particular during terrestrial, aerial, spatial and/or underwater robotics.

The method and the device for detecting a contrast edge having a light transition zone which is substantially rectilinear in a given direction, according to the invention, are noteworthy in that they involve or allow implementation, in another direction transverse to this given direction, of periodic positional scanning of the total angle of vision of a first and a second optical sensor by relative translation of the assembly formed by this first and second optical sensor in this other direction, the law of periodic scanning corresponding to non-uniform scanning for at least a portion of each period of periodic scanning, the total angle of vision being delimited by the average direction of observation of this first and second optical sensor and measurement, on the basis of the signals delivered by the first and second optical sensor, of a time difference between these signals which is linked to the angular position of this light transition zone, relative to the average direction of this total angle of vision forming a reference direction, based on the scanning law, this reference direction being linked to a specific value of this time difference.

The method and the device for detecting a contrast edge, according to the present invention, are used for industrial implementation of systems for the fixing and fine tracking of a target having at least one contrast edge, in which a method for compensating for the sighting line similar to the VOR process of human sight can be employed, owing to the high precision and high speed of this method and this device and also to the high miniaturization and extreme lightness of this device, of which the very low inertia permits such implementation in a particularly noteworthy manner.

BRIEF DESCRIPTION OF THE DRAWING FIGURES

A more detailed description of the method and the device for detecting a contrast edge and of a system for the fixing and fine tracking of a target comprising at least one contrast edge, according to the invention, will now be given in conjunction with the drawings hereafter, in which;

FIG. 1 shows, by way of illustration, a block diagram of implementation of the method for detecting a contrast edge according to the present invention;

FIG. 2a to 2h show, by way of illustration, differing sub-steps for implementation of the method shown in FIG. 1, these sub-steps allowing, in particular, detection, relative to an average direction, of the angular position of the light transition zone of the contrast edge, on the basis of the scanning law and the time difference $\Delta t$ as a function of the relative angular position of the first and the second optical sensor with respect to the light contrast zone, this time delay translating the misalignment of the average direction of observation of the first and the second optical sensor relative to this light transition;

FIG. 3a shows, by way of illustration, a block diagram of a device for detecting a contrast edge according to the present invention;

FIG. 3b gives an example of static input/output characteristics (in volts per degree) of the detector according to the invention, obtained in front of a contrast edge ($C_1$) or a black bar ($C_2$) having a width of 1 cm, both placed 130 cm from this detector;

Figure 7A:
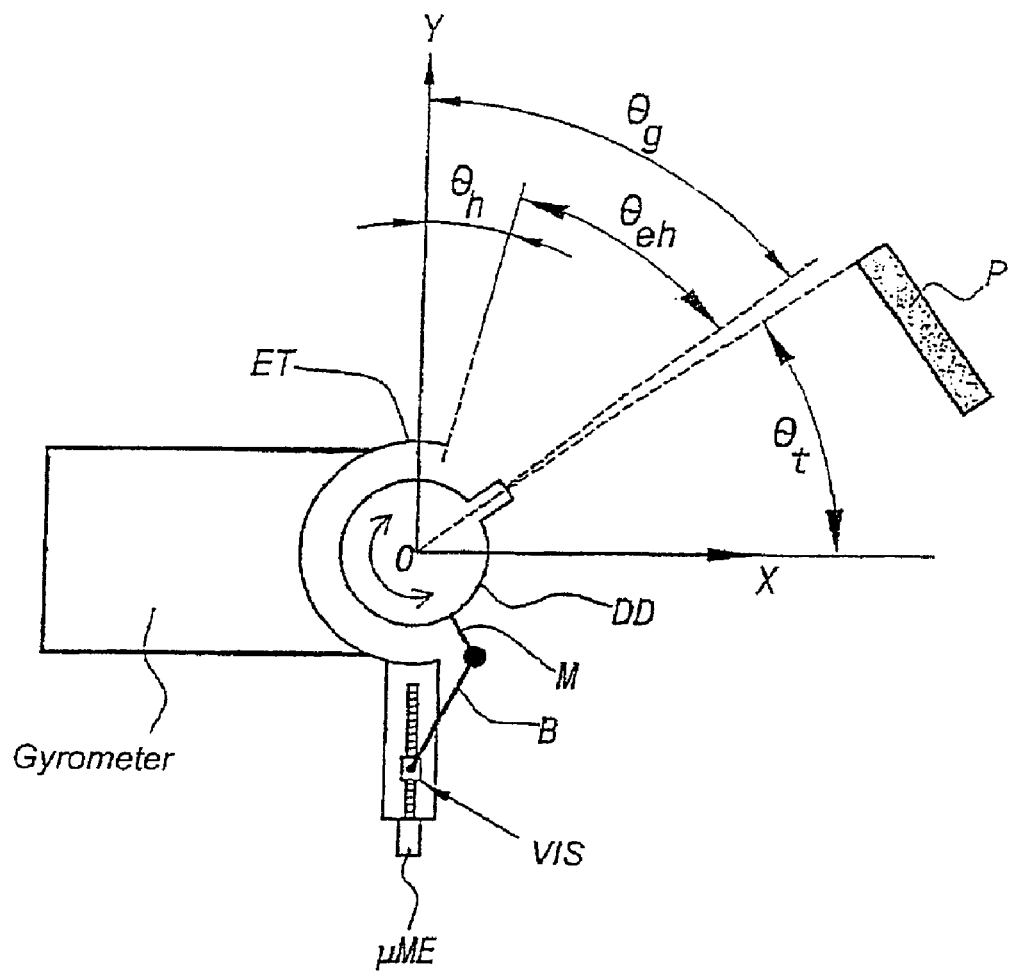
FIG. 7a is a plan view of the portion of the system for visual fixing and fine tracking according to the invention, for defining the operating parameters thereof, in the context of the visual fixing and fine tracking system shown in the aforementioned figure.
Figure 7B:
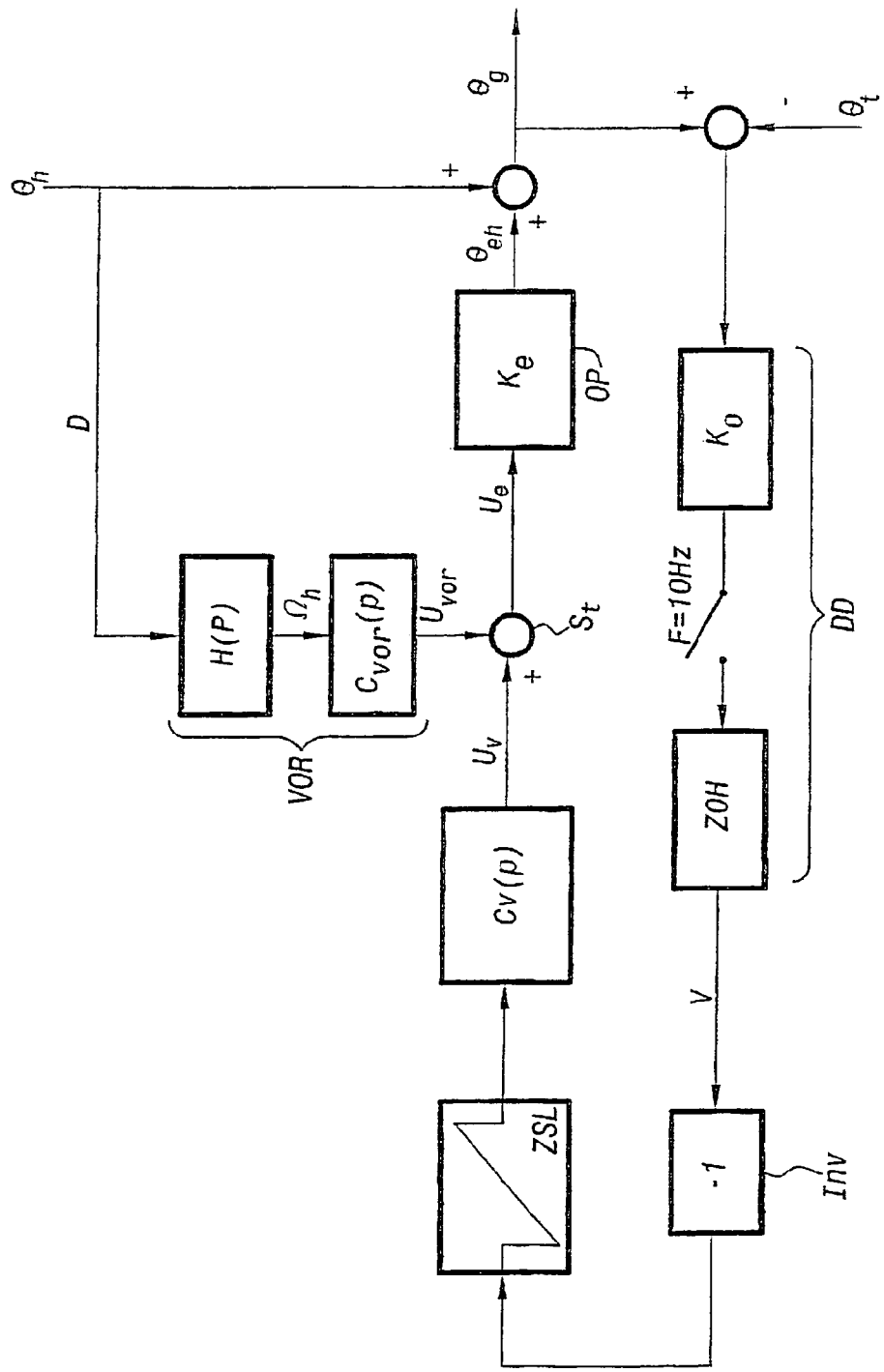

FIG. 7b shows, by way of illustration, a general block diagram of the visual fixing and fine tracking system according to the invention for the parameters or state variables shown in FIG. 7a when the detection device according to the invention incorporates the system for the visual fixing and fine tracking of a target according to the invention and the visual fixing and fine tracking process is assisted by a second system substantially corresponding to the VOR process for stabilizing the line of observation of human sight.

DETAILED DESCRIPTION OF THE INVENTION

A more detailed description of the method for detecting a contrast edge having a light contrast zone which is substantially rectilinear in a given direction, according to the present invention, will now be given in conjunction with FIG. 1 and the following figures.

Figure 1:
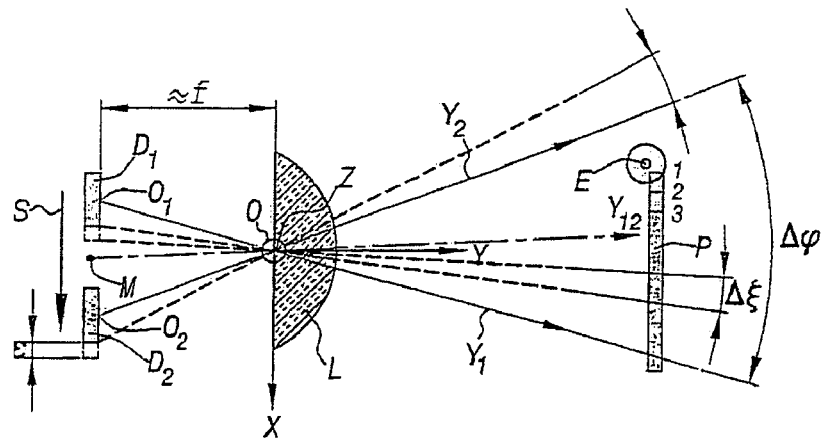

Referring to the aforementioned FIG. 1, it is mentioned that the light contrast zone, light transition zone and, in particular, the contrast edge are rectilinear in a direction which is substantially orthogonal to the plane of the edge containing FIG. 1, the given direction, being, for example, the direction of the edge E of a plate P shown here at the successive positions 1, 2 and 3.

The process according to the invention consists at least in carrying out, in another direction transverse to the given direction corresponding to the edge E of the plate P, periodic scanning of the angular position of the total angle of vision $\Delta\phi$ of a first and a second optical sensor denoted by $D_1$ and $D_2$.

Referring to FIG. 1, it will be appreciated that the periodic positional scanning of the total angle of vision involves angular scanning of this position in the plane of FIG. 1, the total angle of vision being given by two directions $O_1Y_1$ of the sighting axis of the first optical sensor $D_1$ and $O_2Y_2$ of the sighting axis of the second optical sensor $D_2$.

In a non-limiting embodiment, it is mentioned that this total angle of vision can be formed by a convex lens L, the optical sensors $D_1$ and $D_2$ thus being placed substantially in the image focal plane in the aforementioned lens L.

According to a particularly noteworthy aspect of the method according to the invention, periodic positional scanning of the total angle of vision $\Delta\phi$ is carried out by relative translation of the assembly formed by the first and second optical sensor $D_1$ and $D_2$ and of the lens L in this other direction, this other direction, in FIG. 1, being contained in the plane containing this figure. Translational scanning is denoted by S and is represented by an arrow.

The law of periodic scanning corresponds to non-uniform scanning for at least a portion of each periodic scanning period, the total angle of vision denoted by $\Delta\phi=(O_1Y_1,O_2Y_2)$ thus being delimited by the average direction of observation of the first and second optical sensor $D_1$, $D_2$.

The method according to the invention also consists in detecting the time difference between the signals delivered by the first and second optical sensor $D_1$ and $D_2$, this time difference $\Delta t$ being linked to the angular position of the light transition zone, in other words of the edge E of the plate P, relative to the reference direction. The reference direction is advantageously the direction $MOY_{12}$ substantially corresponding to the average time direction of the bisector between the sighting directions of the first and second optical sensor $D_1$, $D_2$.

Thus, a linear displacement of amplitude $\epsilon$ applied to the assembly formed, for example, by the first and the second sensor $D_1$ and $D_2$ according to the translational scanning S causes rotation of the total angle of vision $\Delta\phi$ and causes the directions of observation $OY_1$, $OY_2$ to rotate by an angle $\Delta\xi$.

The process for measuring the aforementioned time difference $\Delta t$, the image of the angular position of the light contrast zone E relative to the reference direction $MOY_{12}$, on the basis of the scanning law $\Omega$, will now be described in conjunction with FIG. 2a to 2h.

Figure 2A:
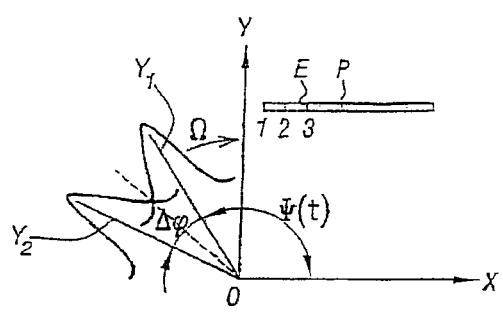

FIG. 2a shows the process of periodic scanning of the angular position of the total angle of vision $\Delta\phi$. In particular, it will be noted that the aforementioned total angle of vision is delimited by the directions $OY_1$ and $OY_2$ corresponding to the maximum sensitivity of each of the optical sensors $D_1$ and $D_2$, the sensitivity curves thereof in the plane OX,OY, the plane of FIG. 1, conventionally corresponding to bell-shaped curves.

In the aforementioned FIG. 2a, the plate P occupies position 1, 2 or 3 in FIG. 1, these positions being selected arbitrarily in order to explain the process described hereinafter.

Scanning at angular velocity $\Omega$, which can be varied by the total angle of vision $\Delta\phi$ of the contrast edge E having the substantially rectilinear light contrast zone parallel to the axis OX, in FIG. 2a, this contrast edge being located in position 1, 2 or 3 in the aforementioned figure, means that the angular velocity $\Omega(t)$ of scanning of the total angle of vision, represented by $1/\Delta t$ measured by the pair of optical sensors $D_1$ and $D_2$, differs depending on whether the contrast edge E of the plate P is located in position 1, 2 or 3.

Figure 2B:
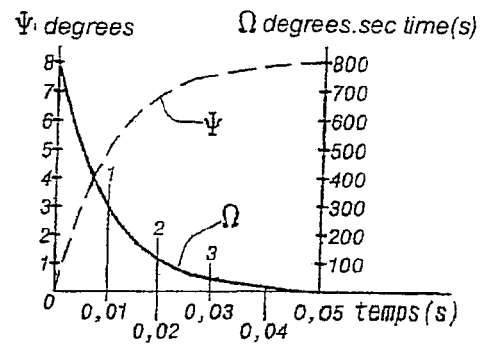

FIG. 2b shows a periodic scanning law corresponding to scanning non-uniform in time, the law of scanning $\Omega$ as a function of time being shown in FIG. 2b as well as the angle $\psi$, as a function of time, of a direction $OY_1$ delimiting the total angle of vision, the x-axis of FIG. 2b being graduated in seconds and the y-axis for the scanning law $\Omega$ being graduated in degrees.$s^{-1}$ or in degrees in the angle $\psi$.

Figure 2C:
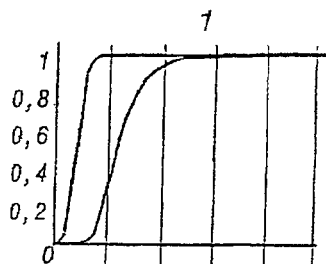
Figure 2D:
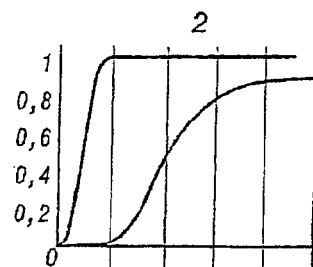
Figure 2E:
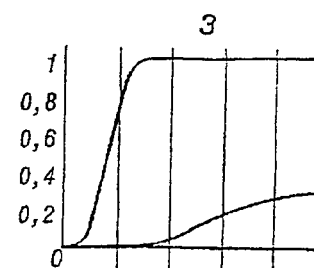

FIGS. 2c, 2d and 2e show the output signals delivered by the optical sensors $D_1$ and $D_2$, depending on the position of the contrast edge E during the scanning operation for positions 1, 2 and 3 shown in FIG. 1, 2a or 2b.

Figure 2F:
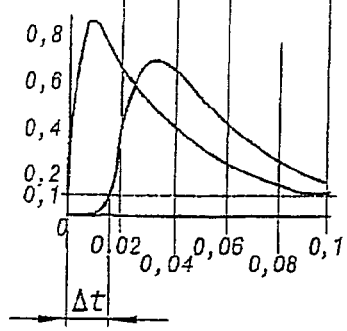
Figure 2G:
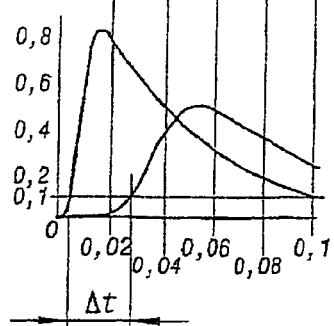
Figure 2H:
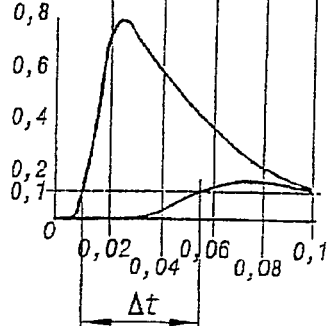

The aforementioned output signals are thus advantageously filtered by means of a high-pass filter of order 1, which allows thresholding of the aforementioned signals and therefore measurement of the time difference $\Delta t$, as shown in FIGS. 2f, 2g and 2h for the positions 1, 2 and 3 corresponding to FIG. 2c, 2d, 2e respectively.

The basic result is that the time difference $\Delta t$ between the filtered signals delivered by the sensors $D_1$ and $D_2$ varies according to the position 1, 2, 3 of the contrast edge E: the process enables an angular position to be coded by a time difference.

The x-axis in FIG. 2c to 2h is graduated in time, in other words in seconds, and the y-axis is graduated in relative amplitude from 0 to 1 of the signal delivered by the optical sensors $D_1$ and $D_2$ respectively or by the filtering process in the case of FIG. 2f to 2h.

It will obviously be appreciated that, for carrying out the method according to the invention, it is possible to carry out translational scanning S of the assembly formed by the first $D_1$ and the second $D_2$ optical sensor with respect to the lens L and that, reciprocally, this step of periodic positional scanning can advantageously correspond to carrying out translation the lens of the same amplitude but in the opposite direction in front of the first and second optical sensor $D_1$ and $D_2$ which are kept stationary.

Under these conditions, it will be appreciated that the laws of delay $\Delta t$ between the signals delivered by the first and the second optical sensor $D_1$ and $D_2$, as shown in FIG. 2c to 2e, in the case of the scanning law $\Omega$ illustrated in FIG. 2a or 2b, involve periodic scanning carried out round the reference direction $MOY_{12}$, as shown in FIG. 1.

Preferably, in a non-limiting manner, the direction of the contrast edge E orthogonal to the plane of FIG. 1 and of FIG. 2a and the transverse direction in which the angular positional scanning of the total angle of vision, corresponding substantially to the direction OX in FIGS. 1 and 2a, are orthogonal.

With regard to implementation of the process for measuring the delay $\Delta t$, as shown in conjunction with FIG. 2a to 2h, it is mentioned that this measuring process can be carried out in a non-limiting manner in accordance with a prior art detection device, as described in the article designated $A_2$ and entitled "Visual Servo System based on a biologically-inspired Scanning Sensor", published by Stéphane Viollet and Nicolas Franceschini, CNRS Laboratoire de Neurobiologie, LNB 3, 31 Chemin Joseph Aiguier 13402 Marseille Cedex France, edited by SPIE Conference on Sensor Fusion and Decentralised Control in Robotic Systems II, Boston, Mass., September 1999: SPIE Vol. 3839. 0277-78 6X/99.

It will be appreciated that, with a particularly advantageous process for carrying out the method according to the present invention, translational scanning either of the assembly formed by the first and the second optical sensor $D_1$ and $D_2$ or, on the contrary, of the lens L facing them, when they are stationary, allows implementation of a law of scanning of angular position of the total angle of vision $\Delta\phi$, according to an angular position thereof, corresponding for example to the law of angular scanning of the assembly formed by the first and the second sensor $D_1$ and $D_2$ and by the lens L, as described in the aforementioned document $A_2$.

On the other hand and according to a noteworthy aspect of the method according to the present invention, the processing process, in the case of angular positional scanning, can thus be substantially identical to the one described in the aforementioned article, even though the scanning described therein is achieved by total rotation of the assembly comprising the lens+optical sensors $D_1$, $D_2$.

A more detailed description of a device for detecting a contrast edge, having a light contrast zone which is substantially rectilinear in a given direction in accordance with the subject of the present invention, will now be given in conjunction with FIG. 3a, 3b and the following figures.

The device according to the invention obviously comprises at least the first and the second optical sensor $D_1$ and $D_2$ from FIG. 1, which has the total angle of vision $\Delta\phi$, as defined hereinbefore, and a lens L having an optical centre.

The first and the second optical sensor $D_1$ and $D_2$ are placed substantially in the image focal plane of the lens L, the average directions of observation of the first and second optical sensor $D_1$ and $D_2$ substantially corresponding to a line $(O_1 OY_1, O_2 OY_2)$ linking the centre of the first or the second optical sensor respectively and the optical centre of the lens L, as shown in particular in FIG. 1.

Figure 3A:
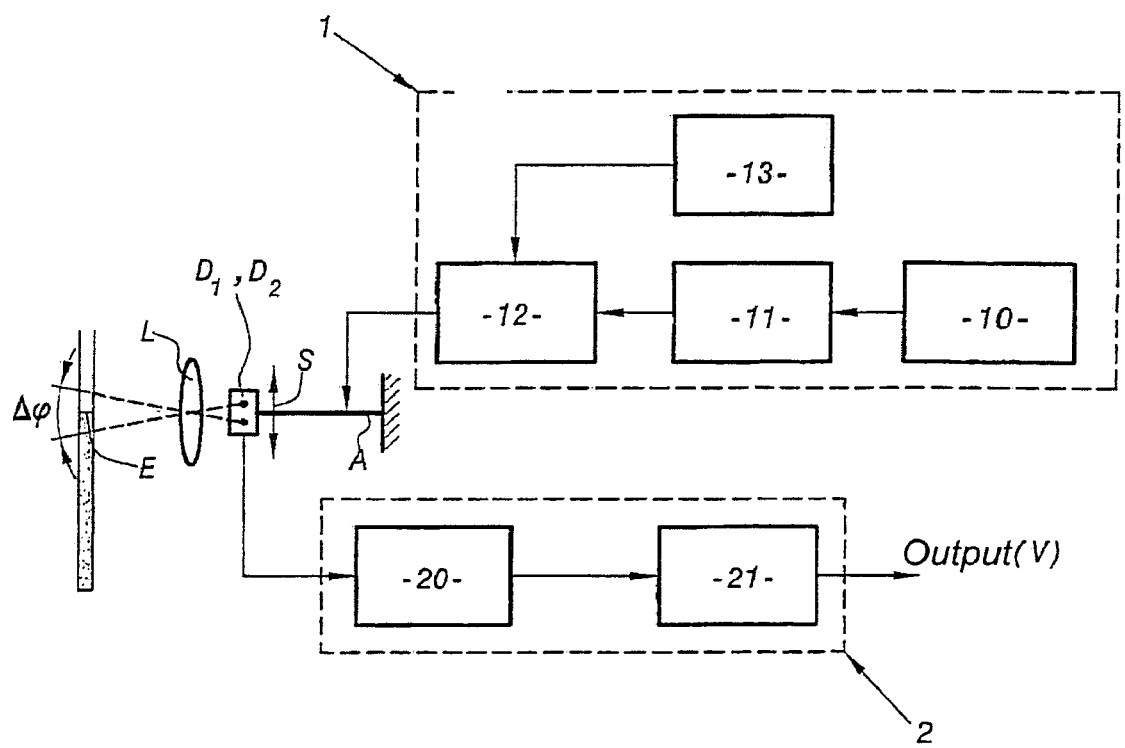

As shown in FIG. 3a, the device according to the invention also comprises resources for relative translational displacement of the assembly formed by the first and the second optical sensor $D_1$, $D_2$ relative to the light contrast zone, in other words the zone aimed at in another direction which is transverse to the given direction of the aforementioned contrast edge. This displacement is a displacement according to periodic angular scanning of the aforementioned total angle of vision $\Delta\phi$ according to the law of periodic angular scanning, which is non-uniform for at least a portion of each scanning period, the scanning law $\Omega$ as represented in FIGS. 2a and 2b, repeated periodically.

The relative translational displacement resources are denoted by A and 1 in FIG. 3a. In addition, the device for detecting a contrast edge according to the invention comprises a detection circuit 2 which measures, on the basis of the signals delivered by the first and the second optical sensor $D_1$ and $D_2$, the time difference $\Delta t$ as a function of the angular position of the light contrast zone, the contrast edge E, relative to a reference direction, the direction $MOY_{12}$ contained in the total angle of vision $\Delta\phi$, this detection being carried out on the basis of the scanning law $\Omega$.

In a preferred non-limiting embodiment, it is mentioned that the first and the second optical sensor $D_1$ and $D_2$ are each formed by a photoelectric sensor such as a photoelectric diode, of which the spectral sensitivity can be selected either in the visible range or even in the ultraviolet range or, alternatively, in the infrared range, for example for nocturnal detection.

The choice of the wavelength of maximum sensitivity of the aforementioned photodiodes can thus be made as a function of the application of the device for detecting a contrast edge according to the present invention.

With regard to the implementation of the detection circuit 2, it is mentioned that it can advantageously comprise a separating amplifier 20, also called a trans-impedance amplifier, and an elementary movement detection (EMD) circuit 21 receiving the signals delivered by the first and second optical sensor $D_1$ and $D_2$ after amplification by the separating amplifier 20 and, on the basis of the time delay $\Delta t$ and the non-uniform scanning law $\Omega$, enabling delivery of an output signal V substantially proportional to the reciprocal, $1/\Delta t$, of the time difference $\Delta t$ and consequently substantially proportional to the angular position of the light contrast zone E relative to the reference direction $MOY_{12}$.

With regard to the implementation of the elementary movement detector circuit 21, it is mentioned that this circuit can substantially correspond to the circuit described in the aforementioned article $A_2$ edited in 1999 and to which reference may be made for a more detailed description of this circuit, in particular Chapter 3 thereof which is entitled "Measuring angular speed with an LMD".

Figure 3B:
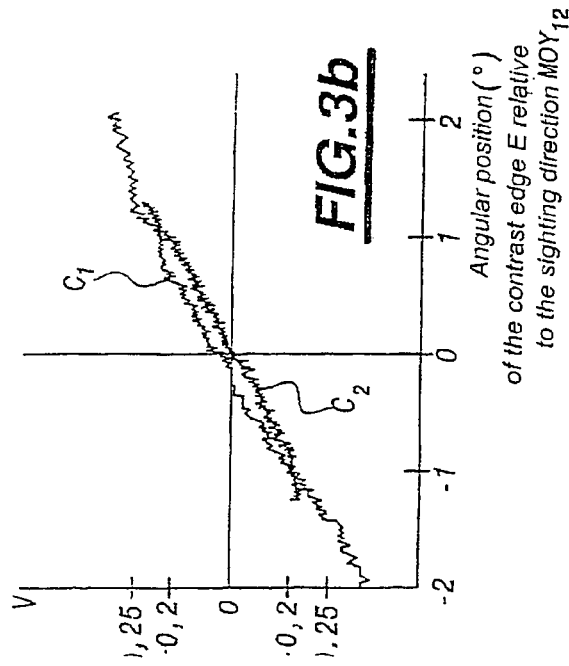

FIG. 3b shows the output signal V delivered by the elementary movement detector circuit 21, the x-axis of FIG. 3b being graduated in positive or negative angular values of the angular position of the contrast edge E relative to the sighting line $MOY_{12}$ of the sensor. The y-axis in FIG. 3b is graduated by positive or negative relative amplitude of the signal V delivered by the circuit 21.

It is noted that the value of this signal is substantially linear in the case of angular position offsets of between –2° and +2°.

A more detailed description of the relative translational displacement resources of the assembly formed by the first and the second optical sensor $D_1$ and $D_2$ or of the lens L with regard to the light contrast zone E will now be given in conjunction with FIG. 4a to 4e with reference to FIG. 3a.

Figure 4A:
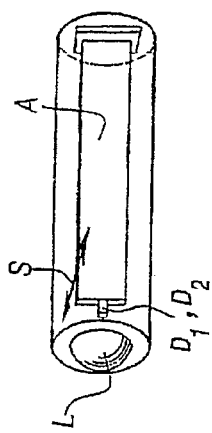
FIGS. 4a, 4b, 4c, 4d and 4e show, by way of illustration, specific embodiments of the detection device according to the present invention, as shown in FIG. 3a, or a first, a second, a third, a fourth and a fifth variation thereof.
Figure 4D:
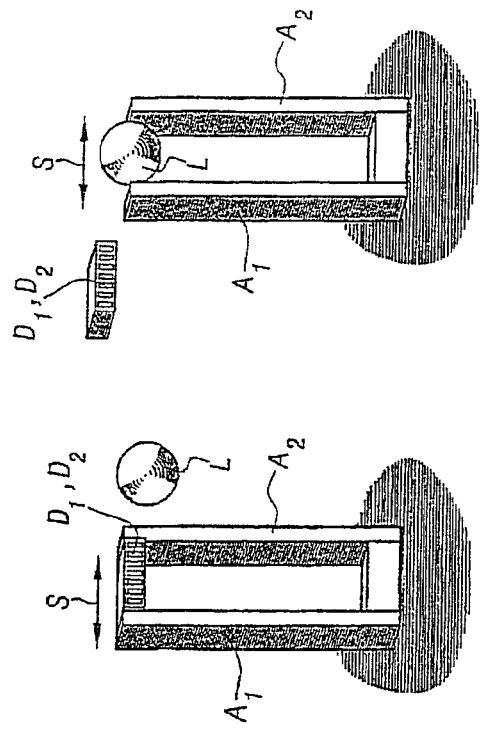
Figure 4C:
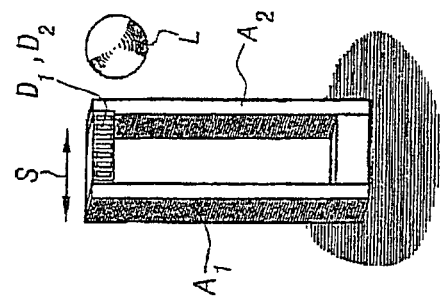
Figure 4B:
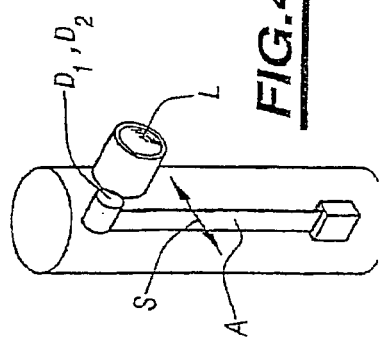

As shown in FIG. 4a, 4b, for example, the relative translational displacement resources comprise, when the lens L is stationary, a deformable support element A of which one end is integral with a stationary reference mechanical support and of which the other end carries the first and second optical sensor $D_1$, $D_2$.

The aforementioned resources also comprise a circuit for application to the deformable support A, which thus forms an actuator, of a periodic displacement control stress for generating a periodic translational displacement in the other direction, the scanning direction S, of the assembly formed by the first and the second optical sensor $D_1$, $D_2$, according to the scanning law relative to the stationary reference mechanical support.

Referring to FIGS. 3a, 4a, 4b, 4c and 4d, the stationary reference support is represented by hatching.

Preferably, and as shown in FIG. 4a or 4b, the actuator A supports the assembly of optical sensors $D_1$ and $D_2$ at one of its ends and the other end thereof can, for example, be fixed to the stationary mechanical reference. The assembly can advantageously be enclosed in a tubular enclosure made of carbon, for example the front end of the tubular enclosure comprising the lens L in FIG. 4a, whereas a window made on the surface generated by revolution of the tubular chamber allows a reception of the lens L which is thus placed opposite the optical sensors $D_1$ and $D_2$, as show in FIG. 4b.

A more detailed description of the actuator A for generating the translational displacement will now be given in conjunction with FIG. 4c and FIG. 4d, independently of the application of the relative displacement to the assembly of optical sensors $D_1$, $D_2$ or to the lens L.

Preferably, as shown in FIGS. 4c and 4d, the actuator A can be formed by two matched piezoelectric blades $A_1$ and $A_2$ which are fixed to the stationary support at one of their ends, the opposite end comprising the assembly of optical sensors $D_1, D_i, \ldots D_n$, as shown in FIG. 4c, or the lens L as shown in FIG. 4d.

It will be appreciated, in particular, that the piezoelectric blades can be made up in a non-limiting manner of two matched bimorphic or monomorphic piezoelectric blades, or else of a piezoelectric blade and a spring blade, for example, or of equivalent means. Under these conditions, the application of an electrical voltage adapted in accordance with the scanning law allows the application of a stress for controlling periodic displacement in the scanning direction S, as shown in FIGS. 4c and 4d.

In a variation, one of the two piezoelectric blades can be used as a position sensor for the photodiodes $D_1$, $D_2$, FIG. 4c, or of the lens L, FIG. 4d, this sensor thus being able to be included in a loop for positional servo control of the photodiodes or the lens. For the same purpose, a circuit for measurement, using strain gauges, of the linear position of the first and the second optical sensor $D_1$, $D_2$ or of the lens L, on the basis of the deformation of the deformable support, may advantageously be provided.

As shown in FIG. 3a, the resource 1 allowing application of a displacement control stress can advantageously comprise a scanning generator 10 which delivers a scanning voltage, a shaping circuit 11 receiving the scanning voltage and delivering an intermediate scanning control signal and a high-voltage amplifier circuit 12 supplied with direct current voltage via a high-voltage generator 13, the high-voltage amplifier circuit being controlled by the intermediate scanning control signal delivered by the shaping circuit 11 in order to deliver a periodic displacement control voltage which is obviously applied to the actuator A in FIGS. 4a and 4b and, in particular, to the piezoelectric blades $A_1$ and/or $A_2$ in FIGS. 4c and 4d.

With regard to the application of the aforementioned displacement control stress, it is mentioned that this displacement stress can be brought back to a mere calibration of the angular displacement described by the article $A_2$ edited in 1999. As shown in FIG. 1, the translational displacement 4 can be assimilated to the rotation $\Delta\xi$ of the total angle of vision $\Delta\phi$ or of the half-angle thereof given substantially by the ratio of the half-distance of the centres $O_1$ and $O_2$ separating the optical sensors $D_1$ and $D_2$ and the focal distance f of the lens L.

Figure 4E:
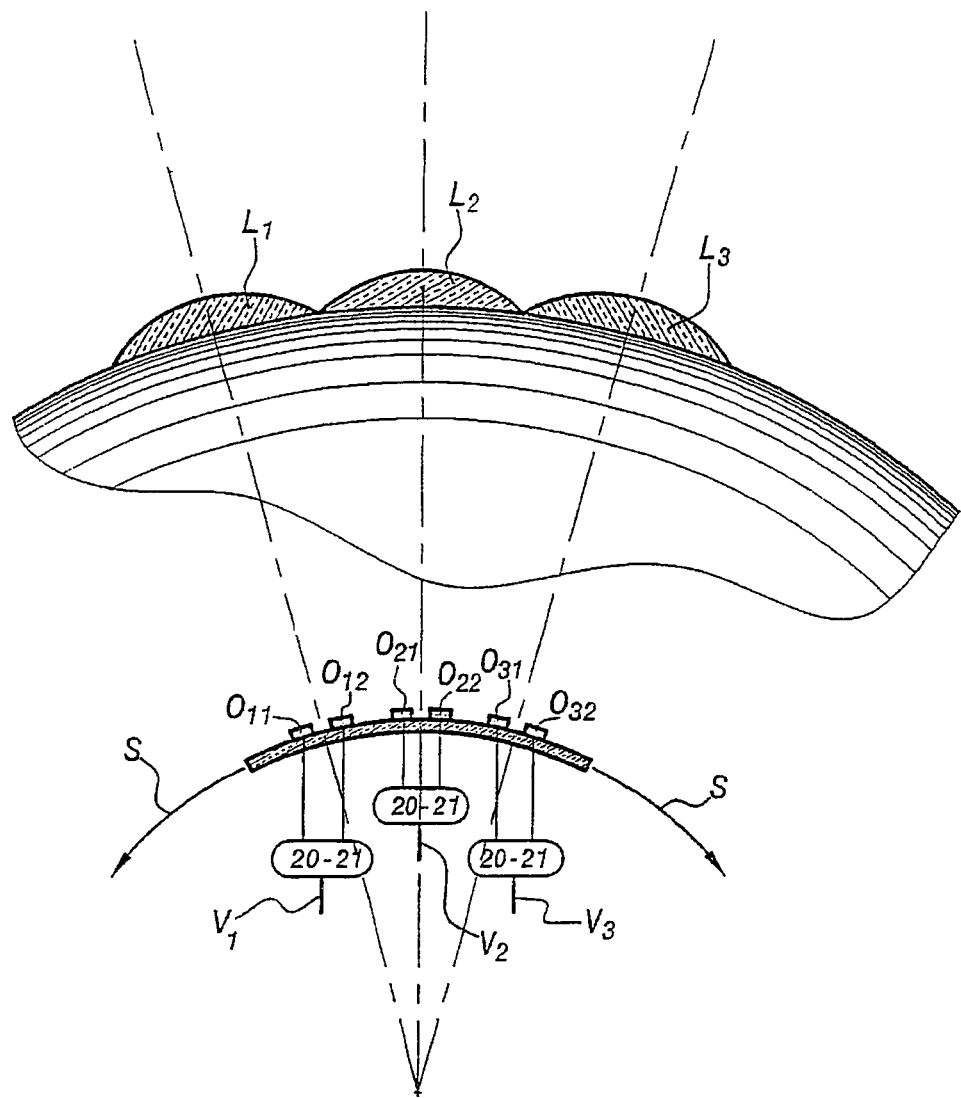

According to a variation shown in FIG. 4e, a plurality of devices, as described hereinbefore in conjunction with the aforementioned figures, can be provided in order to increase the total field of vision of the detection device until it is rendered panoramic, if necessary. Each device forming an elementary device comprises a stationary lens, denoted by $L_1$ to $L_3$, by way of a non-limiting example. These elementary devices are arranged substantially on a spherical surface comprising a common centre, this common centre constituting, for the acquisition system, the optical centre of a total angle of vision broadened to all the total angles of vision $\Delta\phi$ of each of the devices taken together.

In the aforementioned FIG. 4e, the number of elementary devices is voluntarily limited to three, in order not to overload the drawing.

Under these conditions, each pair of first and second sensors $O_{11}$, $O_{12}$; $O_{21}$, $O_{22}$ and $O_{31}$, $O_{32}$ for the lenses $L_1$, $L_2$ and $L_3$ respectively can thus be connected to an elementary movement detecting device actually comprising a detection circuit, symbolized by 20-21, for each of the elementary devices. The output signal delivered by each $V_1$, $V_2$ and $V_3$ can thus be sampled for subsequent digital processing.

A more detailed description of a particularly advantageous embodiment of the device for detecting a contrast edge according to the subject of the present invention will now be given in conjunction with FIGS. 5a and 5b.

In general, it will be recalled that the direction S, in which periodic scanning by relative translation of the assembly formed by the first and the second optical sensor $D_1$, $D_2$ with respect to the contrast edge E is carried out can theoretically be any direction. In a non-limiting embodiment, however, when this scanning is carried out with the aim of detecting a single contrast edge E, this direction can advantageously be perpendicular to the given direction in which the contrast edge E extends.

It is mentioned that such a mode of operation may be facilitated by orienting the scanning direction S in a plane substantially corresponding to the focal plane of the lens L.

Figure 5B:
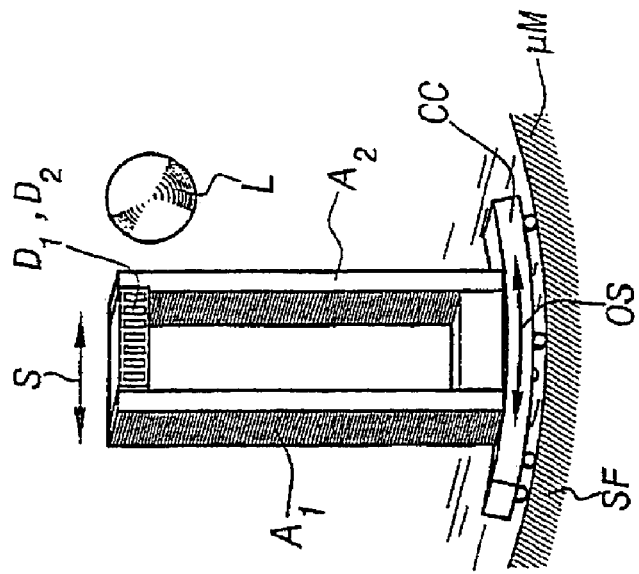
FIGS. 5a and 5b show, as a non-limiting example, a first and a second non-limiting variation of the detection device according to the invention, in which the translational scanning direction applied to the optical sensors can be adjusted in a direction substantially perpendicular to the contrast edge, for a specific application.
Figure 5A:
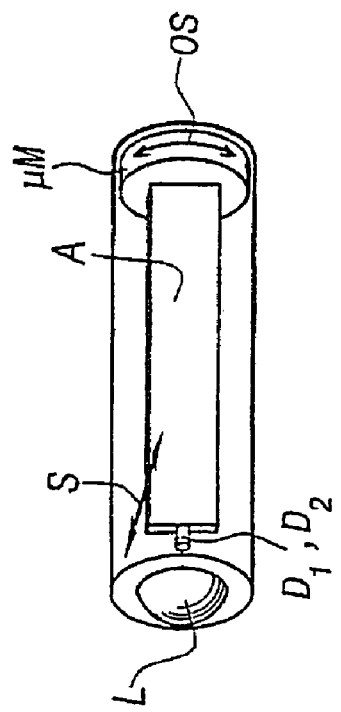

For this purpose and in accordance with an advantageous embodiment of the detection device according to the present invention, the detection device, as shown in FIGS. 5a and 5b, advantageously comprises a device for orienting the assembly formed by the deformable support element A or the assembly of the first and second optical sensor $D_1$, $D_2$ and the stationary reference mechanical support. This orientation device thus allows orientation of the direction of periodic translational displacement S of the first and the second optical sensor $D_1$, $D_2$ in this other direction which is transverse to the given direction of the substantially rectilinear light contrast zone, the contrast edge E.

In the case of FIG. 5a where the lens L is at the front of the tubular enclosure comprising the assembly of diodes $D_1$, $D_2$ and the actuator A, it is mentioned, as shown in this figure, that the support can consist of a platform driven by a micromotor µM, causing the assembly formed by the actuator A, the diodes $D_1$ and $D_2$ and obviously the stationary support to form a rotation about the longitudinal axis of the assembly, represented by the double arrow OS, the effect of which is to modify the orientation of the scanning S.

It will thus be appreciated that the scanning direction S is thus oriented relative to the direction (not shown in the drawings) of the contrast edge E.

If, on the other hand, the assembly formed by the optical sensors $D_1$ and $D_2$ is placed opposite a stationary lens L, as shown in FIG. 5b, the actuator A, in particular if it is formed by the actuators $A_1$ and $A_2$ which are integral with the assembly formed by the diodes $D_1$, $D_2$ as shown in FIG. 5b, can thus advantageously be mounted on a moving circular crown, denoted by CC, mounted on a ball bearing of which the axis is combined with that of L relative to a stationary support SF in the form of a circular guide rail, for example. The assembly of the circular crown CC of the actuator A or $A_1$, $A_2$ and of the assembly of diodes $D_1$, $D_2$ in FIG. 5b can thus be positioned in orientation by means of a micromotor µM not shown in the drawings and thus delivering a new scanning direction S.

Figure 6A:
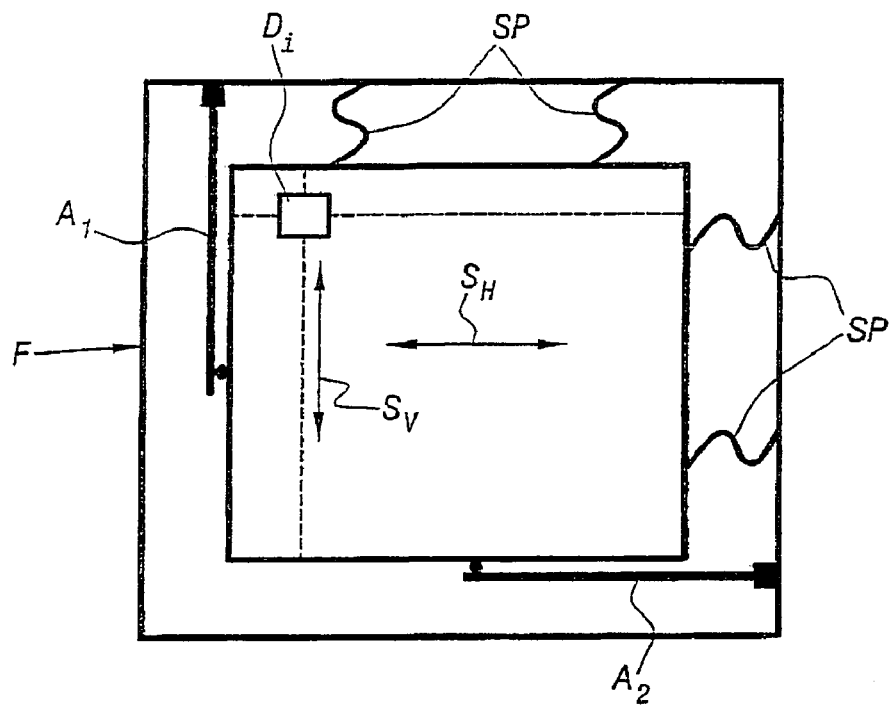
FIGS. 6a and 6b show, by way of a non-limiting example, two further variations of the detection device according to the invention which can be used more particularly for two-dimensional scanning and are applicable to two-dimensional targets.

Finally, for detecting a two-dimensional target comprising at least two contrast edges, the device for detecting a contrast edge according to the present invention can comprise, as shown in FIG. 6a, a first and a second detection device, as described hereinbefore in the description in conjunction with FIG. 4a to 4c, for example, the first and the second optical sensor of the first or the second detection device and the directions of periodic relative displacement thereof being substantially perpendicular.

Figure 6B:
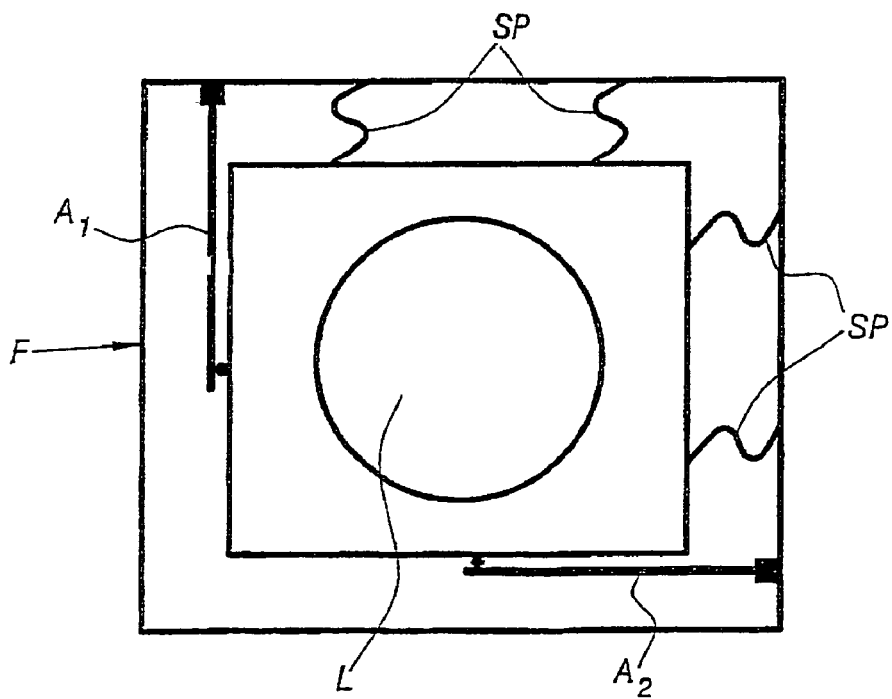

In a non-limiting embodiment, as shown in FIGS. 6a and 6b, the two optical sensors $D_1$ and $D_2$ can advantageously be replaced by a matrix of optical detectors such as photodiodes, each constituting a pixel $D_i$, the rectangular matrix of diodes made up in this way forming a two-dimensional retina.

Under these conditions, the two directions of periodic relative displacement are thus substantially perpendicular and are referenced $S_V$ and $S_H$ in FIG. 6a. The matrix of diodes can thus be mounted in a border F forming a rigid frame and can be fixed by springs SP which provide adequate suspension relative to the border F, for the diode matrix formed in this way, and the actuators are actuators $A_1$ and $A_2$ which are mounted in a manner similar to that described in conjunction with FIG. 4a to 4c, for example by means of a microbead, to carry out scanning in the vertical direction $S_V$ or horizontal direction $S_H$ respectively.

An arrangement of this type can preferably be achieved, as shown in FIG. 6b, by applying the displacement stress having two aforementioned dimensions not to the photodiode mosaic $D_i$ but to a border supporting the lens L placed in front of a matrix of stationary diodes and thus traveling in a plane perpendicular to its optical axis and at a constant photodiode distance.

Under these conditions, to perform horizontal scanning $S_H$ or vertical scanning $S_V$ and according to a specific embodiment of the detection device according to the present invention, it is mentioned that the vertical periodic scanning and horizontal periodic scanning can thus be carried alternately. Detection can therefore be carried out in synchronization with the vertical scanning and the horizontal scanning respectively.

By way of example, a contrast edge detector according to the present invention, in which the rotational scanning of the total angle of vision of the optical sensors is obtained by rectilinear translational scanning of two photodiodes placed substantially in the focal plane of a lens of focal distance f=8.5 mm gave the following results:

| Parameter | Sensor according to the invention |
|---|---|
| $\Delta\phi$ | 4° |
| $\Delta\alpha$ (minimum visible) | 8% $\Delta\alpha$ = 0.3° |
| $\Delta\phi$ | |
| Detection distance of a 10 mm wide black bar | 2 m |
| Acuity of angular location | 2.5% of $\Delta\phi$ (0.09°) |
| Range of detectable contrast | 0.1 to 0.8 |

The piezoelectric type actuator with a broad bandwidth of 500 Hz having a small mass of 1.4 g allows the generation of amplitude translation which is a great as 1 mm, in an open loop, with low response times.

The use of a lens L of which the focal distance is 50 times greater than that of 8.5 mm of the tested detector device according to the invention enables a 50 mm wide black bar, such as a high-voltage cable for an electric line, to be detected at a distance of 500 m, or else a 100 mm diameter black bar such as an aerial tramway cable at a distance of 1 km.

A more detailed description of a system for the fixing and fine tracking of a target comprising at least one contrast edge having a light contrast zone which is substantially rectilinear in a given direction which constitutes this contrast edge E will now be given in conjunction with FIGS. 7a and 7b.

FIG. 7a is a plan view of an assembly constituting a stabilization system for the line for the sighting and fine tracking of a target comprising at least one contrast edge E according to the subject of the present invention.

The aforementioned system comprises a detection device DD as described hereinbefore in the description in conjunction with FIG. 1 to 4e, more particularly 4b, and a mechanical support ET in which this detection device can be oriented.

In the aforementioned figure, ET designates a housing which symbolically represents the spatial reference of the human skull and the device DD is therefore a faithful representation of a human eye capable of moving in its socket. An electronic micromotor µME, via a joint system comprising a screw V, link B and crank M without play, allows orientation of the detection device D according to the subject of the present invention relative to the external housing ET and allows a movement comparable to that of the eyeball in its socket in the human skull.

The angular position of the housing ET in an absolute marker is denoted by $\theta_h$. The sighting line of the detection device DD (axis $MOY_{12}$ in FIG. 1) is denoted by $\theta_{eh}$ relative to the housing ET and $\theta_g$ relative to the absolute direction OY, this last angle strictly corresponding to the sum $\theta_{eh}+\theta_h$. With regard to the contrast edge E, its angular position in the absolute marker (O, X, Y) is denoted by $\theta_t$.

Referring to FIG. 7a, it will be appreciated that a rotation of the stepping motor µME driven by the control signal $U_e$ causes, via the screw-link-crank system B, a rotation and an orientation of the detection device DD which is free to rotate inside the housing ET. Consequently, the control $U_e$ driving the position of the shaft of the motor µME directly monitors the orientation and therefore the sighting line (=reference direction $MOY_{12}$) of the detection device DD.

The system shown in FIG. 7a enables the sighting line of the detection device DD to be maintained constantly on the contrast edge E, therefore leading to the "fixing" by the detection device DD of this contrast edge if the contrast edge is stationary and the "fine tracking" thereof if the contrast edge is displaced.

According to a noteworthy characteristic of the system according to the invention, all this occurs in spite of the rotational disturbances applied to the support ET. In man, the line of sight of the eye is frequently disturbed by movements of the head. The vestibulo-ocular reflex (VOR) enables these disturbances to be rejected. This reflex enables the line of sight to be kept constant despite the rotational disturbances generated by the head.

FIG. 7b shows the block diagram of the system of stabilizing the line of sight and of fine tracking according to the invention.

Referring to the aforementioned FIG. 7b, it is mentioned that the system according to the invention also comprises a resource H(p) for measuring the speed of rotation $\Omega_h$ of the mechanical support ET. This resource advantageously consists of a gyrometer which is integral with the housing ET, as shown in FIG. 7a.

It also comprises a direct control resource, on the basis of an open loop control signal of the orientation of the reference direction of the detection device DD, this resource delivering a direct control signal $U_{VOR}$ on the basis on the measurement of the speed of rotation $\Omega_h$ of the mechanical support ET.

It finally comprises a loop for visual servo control of the reference direction $MOY_{12}$ relative to the detected direction $\theta_t$ of at least one contrast edge belonging to the target. This visual servo control loop is formed by the detection device DD, an invertor Inv, a non-linear circuit ZSL and a corrector Cv(p) and delivers the control signal $U_v$.

Finally, a merger resource enables a linear combination of the direct control signal $U_{VOR}$ and the control signal $U_v$ to be obtained. Referring to FIG. 7b, the merger resource consists of a subtractor ST, the direct control signal $U_{VOR}$ being subtracted from the direct servo control signal $U_v$.

The difference between $\theta_g$ and $\theta_t$ is an error signal which is measured by the detection device DD. It will be appreciated that the control $U_e$ of the electronic micromotor µME ultimately results at each instant from the difference between a signal $U_v$ originating from the visual servo control loop based on the detection device DD and a signal $U_{VOR}$ originating from a corrector $C_{VOR}$ of which the input is the angular velocity of the housing ET measured using the gyrometer H(p).

The angular position $\theta_h$ of the housing constitutes both:
- a disturbance for the visual loop, which is itself constituted by the transfer functions of the detection device DD, the non-linear limiter ZSL and the corrector CV(p)=Kv/p;
- a control for the visual loop through the control $U_{VOR}$ generated by the corrector filter $C_{VOR}$.

A rotation of the housing ET leads to a rotation of the detection device DD and therefore an angular difference between $\theta_g$ and $\theta_r$. This difference is compensated by the corrector Cv but with slow dynamics because it is limited by the scanning frequency of the detection device DD. The visual loop alone can reject only rotational disturbances having a maximum frequency of 0.4 Hz for an amplitude of 2°. To accelerate the rejection dynamics of the disturbance $\theta_h$, a control $U_{VOR}$ of which the function is to drive the orientation of the detection device DD on the basis of a direct measurement of the angular velocity of the disturbance $\theta_h$ (direct control) has thus been added to the control $U_v$ associated with very slow rejection dynamics.

In the ideal theoretical case, $C_{VOR}$ is calculated so as to perfectly compensate for the dynamics introduced by OP and by H(p):

$$C_{VOR}(p) = \frac{1}{(H(p)Ke)}$$

Consequently, when Uv=0, the following is obtained:

$\theta_{eh} = -\theta_h$

This means that a rotation of the support ET is perfectly compensated by a rotation of the detection device DD of the same amplitude but in the opposite direction.

However, the transfer function $C_{VOR(p)}$ cannot be used directly, as it is not sufficiently stable. This theoretical transfer function has therefore been approximated by the following transfer function:

$$C_{vor}(p) = K\left(\frac{p+a}{bp+1}\right)\left(\frac{-p+c}{p+c}\right) \text{ wherein } K = 0.011,$$

$a = 140$ rad/s, $b = 5$ rad/s and $c = 0.45$ rad/s.

This filter made up in this way, is formed by a pseudo-integrator which is cascaded with an all-pass filter which provides the negative phase without modifying the gain curve of the pseudo-integrator.

Ultimately, the system in FIG. 7b enables a relatively slow visual loop which is responsible for the fixing and the fine tracking of a contrast edge to be combined (merged) with an action allowing the detection device DD to react rapidly to rotational disturbances applied to the support ET. In other words, this system enables two sub-systems to cohabit in a remarkably complementary manner and in combination, these sub-systems each making their contribution:
- a first sub-system which is slow but precise because it is endowed with hyperacuity: the visual loop formed by the servo control loop based on the detection device DD;
- a second sub-system which is fast but imprecise (in terms of drift introduced by the gyrometer): the VOR system.

The aforementioned merging or combination of the detection device system DD according to the invention with a gyrometric system represents a major development thereof.

It has been established by experiments that the oculomotor system shown in FIG. 7a is perfectly capable, owing to the merger or combination achieved, of following a target that is travelling in accordance with a sinusoidal law $\theta_t(t)$ (amplitude 4°, frequency 0.2 Hz) while rejecting a rotational disturbance $\theta_h$ which is also sinusoidal and has a similar amplitude of 4° but a frequency of 2 Hz, which is ten times higher).

Tests on the system modeled in this way, as shown in FIG. 7b, were carried out by testing the rejection of disturbance of head movement, in other words of the external housing ET, in order to maintain a fixed sighting direction involving two types of disturbance applied to the external housing ET:
- an abrupt rotation (scale interval of 3°) $\theta_h$, which is repeated rapidly, or a rotation $\theta_t$ which thus causes fine tracking, as described hereinbefore in the description.

The aforementioned tests have shown that the introduction of a disturbance corresponding to a rotation of the external housing ET by an angle $\theta_h$ generates a disturbance for the visual corrector Cv and for the corrector $C_{VOR}$. This disturbance can be broken down into two portions:
- a transitory portion corresponding to the inertial response of the system VOR of which the response time is merely approximately 10 ms;
- a continuous portion corresponding substantially to the visual response which withstands a longer response time of approximately 100 ms, with which the detection device DD operates effectively, precisely and stably over the long term.

Tests conducted in a laboratory have shown that the direction of sight $\theta_g$ is substantially fixed in space, owing to the use of the complete system of which the block diagram is given in FIG. 7b.

This mode of operation can be compared particularly advantageously to the compensation for the sighting direction of human sight. The tests have shown that, owing to the merging of the visual controls signal $U_v$ and the inertial control signal $U_{VOR}$, a disturbance of the scale interval type, with an amplitude of 3°, applied to the orientation $\theta_h$ of the external housing ET is rejected at 90% of its final value in 30 ms.

A second series of tests was carried out for a disturbance corresponding to a substantially sinusoidal harmonic disturbance of the orientation of the external housing ET, in other words of the head, this disturbance thus being applied to the oculomotor installation.

The tests have therefore shown that, even in the presence of a substantially sinusoidal disturbance at a rapid frequency at 2 Hz imposed on the external housing ET, such a disturbance is immediately compensated by a counter-rotation in phase-opposition of the detection device DD representing the eye, the only effect of this compensation being to cause a slight deviation in the angle of sight $\theta_g$, the effective value of $\theta_g$ having been evaluated at 0.32°, which is 19 times less than the peak-to-peak disturbance of 6° applied to the external housing ET simulating the head.

Finally, tests on the harmonic disturbance applied to the external housing ET were carried out at differing frequencies, the frequency of these disturbances having been selected from a range of values between 0.5 and 6 Hz.

Under these conditions, the variation in the direction of sight $\theta_g$ never exceeded 0.55° up to the aforementioned maximum frequency of 6 Hz.

As a comparison, the maximum frequency of the disturbances that the visual retroaction loop alone is capable of rejecting, in other words in the absence of the combination with the direct control loop VOR, is limited to 0.4 Hz for a peak-to-peak amplitude of 6° applied to the housing.

The performance of the system for stabilizing the line of sight and of fine tracking of a target according to the present invention is noteworthy because the aforementioned system, as described, is capable, when used on board a real-sized helicopter, of compensating the fundamental mode of the vibrations at approximately 5 Hz introduced by the main rotor.

A method and a device for detecting a contrast edge have thus been described, which are particularly powerful in so far as the method and the device according to the invention allow the use of a system which reproduces the behavior of the vision and therefore of the line of sight of the eye of man or of superior mammals.

In particular, the method and the device for detecting a contrast edge according to the present invention and the corresponding system, employing the method and the device, have a wide variety of applications, as mentioned hereinbefore in the introduction to the description.

In particular, it is mentioned as a non-limiting example that the device for detecting a contrast edge according to the present invention, as shown in FIG. 5a or 5b, can be applied directly to assist the navigation of aircraft such as helicopters which are steered or remotely steered for example, in particular when they have to move in difficult operating conditions and, in particular, in an enclosed valley, in an urban area or in the presence of filiform objects such as high-voltage lines.

The invention claimed is:

1. A method for detecting a contrast edge having a light transition zone which is substantially rectilinear in a given direction and separating two regions of differing luminance, comprising the steps of:
   providing a device wherein the device including:
      at least an assembly formed by a first optical sensor and a second optical sensor having a total angle of vision delimited by an average direction of observation of the first optical sensor and the second optical sensor, and
      a lens having an optical centre intercalated between the assembly and the light transition zone, the first optical sensor and the second optical sensor being placed substantially in an image focal pane of the lens;
   carrying out, in another direction transverse to the given direction, periodic positional scanning of the total angle of vision of the first optical sensor and the second optical sensor by relative translation of the assembly in this other direction, a law of periodic scanning corresponding to non-uniform scanning for at least a portion of each period of periodic scanning, the total angle of vision being delimited by the average direction of observation of the first optical sensor and the second optical sensor;
   measuring, on a basis of signals delivered by the first optical sensor and the second optical sensor, a time difference which depends on an angular position of the light transition zone, relative to a reference direction contained in the total angle of vision, based on the scanning law, the reference direction being linked to a specific value of the time difference.

2. The method as claimed in claim 1, wherein said given direction and said other direction transverse to this given direction are orthogonal.

3. A device for detecting a contrast edge having a light transition zone which is substantially rectilinear in a given direction, device comprising:
   at least a first optical sensor and a second optical sensor having a total angle of vision delimited by an average direction of observation of the first optical sensor and second optical sensor;
   a lens having an optical centre, the first optical sensor and the second optical sensor being placed substantially in an image focal plane of the lens and average directions of observation of the first optical sensor and the second optical sensor corresponding substantially to a line linking a centre of the first optical sensor or the second optical sensor and the optical centre of this lens;
   means for relative translational displacement of the assembly formed by the first optical sensor and the second optical sensor relative to the lens, or for translational displacement of the lens relative to the assembly formed by the first optical sensor and the second optical sensor, in another direction transverse to the given direction, with periodic positional scanning of a total angle of vision according to a law of periodic scanning which is not uniform for at least a portion of each periodic scanning period; and
   means for measuring, on a basis of the detection signals, a time difference between the signals linked to an angular position of the light transition zone relative to a reference direction contained in the total angle of vision on a basis of a scanning law, this reference direction being linked to a specific value of the time difference.

4. The device as claimed in claim 3, wherein the first optical sensor and the second optical sensor are each formed by a photoelectric sensor.

5. The device as claimed in claim 3, wherein said means for relative translational displacement comprise, when said lens is stationary:
   a deformable support element integral with said assembly formed by the first optical sensor and the second optical sensor and with a stationary reference mechanical support;
   means for applying, to said deformable support, a stress for controlling periodic displacement to generate a periodic translational displacement in the other direction of the assembly formed by the first optical sensor and the second optical sensor according to said scanning law relative to said stationary reference mechanical support; and
   means for measuring the linear position of the first optical sensor and the second optical sensor or of the lens on a basis of a deformation of the deformable support.

6. The device as claimed in claim 3, wherein said means for relative translational displacement comprise, when the said assembly formed by the first optical sensor and the second optical sensor is stationary:
   a deformable support element integral on the one hand with the lens and with a stationary reference mechanical support;
   means for applying, to the support element, a stress for controlling periodic displacement to generate a periodic translational displacement in the other direction of said lens according to said scanning law relative to said stationary reference mechanical support.

7. The device as claimed in claim 5, wherein said means for applying a stress for displacement control comprise at least:
   a scanning generator delivering a scanning voltage;
   a shaping circuit receiving the scanning voltage and delivering an intermediate scanning control signal, according to the nonuniform scanning law;
   an amplifier circuit, supplied with direct current, controlled by said intermediate scanning control signal and delivering a voltage for periodic control of displacement;
   an electromechanical actuator which is sensitive to the periodic control voltage.

8. The device as claimed in claim 3, wherein said means for measuring the angular position of the light transition zone comprise at least:

a separating amplifier receiving the signals delivered by the first and second optical sensor and delivering amplified signals:
an elementary movement detecting module receiving said amplified signals which allows, on the basis of said time delay and of the nonuniform scanning law, delivery of a signal which depends substantially linearly on the angular position of said light contrast zone relative to said reference direction.

9. The device as claimed in claim 3, wherein the given direction and other direction transverse to said given direction are orthogonal.

10. The device as claimed in claim 3, wherein it further comprises means for orientation of the assembly formed by the deformable support element, the lens or the assembly of the first optical sensor and the second optical sensor, and the stationary reference mechanical support, in order to orient a direction of the periodic translational displacement of the lens or of the assembly of the optical sensors in the other direction transverse to said given direction of the substantially rectilinear light transition zone.

11. The device as claimed in claim 3, wherein the first optical sensor and the second optical sensor are formed by a rectangular matrix of photodiodes and in that the means for relative displacement of the first and second detection device and of the direction of relative periodic displacement thereof are formed by:
a substantially rectangular frame;
means for resilient connection of the photodiode matrix to the frame; and
electromechanical means for alternately generating periodic displacement of the photodiode matrix or of the lens in a first and second direction perpendicular to the frame.

12. The device as claimed in claim 3, wherein the device further comprises a plurality of elementary devices, each elementary device which comprises a stationary lens being arranged substantially on a spherical surface comprising a common centre, the common centre constituting, in the case of said device, the optical centre of a total angle of vision broadened to all the angles of total vision of each of the elementary devices taken together.

13. A system for the visual fixing and fine tracking of a target comprising at least a contrast edge having a light transition zone which is substantially rectilinear in a given direction which constitutes this contrast edge, wherein it comprises at least:
a detection device (DD) as claimed in claim 3;
a mechanical support (ET) in which said detection device can be oriented;
a means $H_{(p)}$ for measuring the speed of rotation of said mechanical support (ET);
a means for direct openloop control of the orientation of the reference direction of said detection device, this control means delivering a direct control signal ($U_{VOR}$) on the basis of measurement of the speed of rotation of said mechanical support (ET);
means forming a visual servo control loop for slaving the reference direction to the detected direction of at least a contrast edge belonging to the target;
means for merging said direct control signal ($U_{VOR}$) and the visual servo control signal by linear combination.

14. The system as claimed in claim 13, wherein the means for direct control of the orientation of the reference direction of the detection device on the basis of a speed of rotation of the mechanical support comprises a corrector ($C_{VOR}(p)$) capable of controlling the reference direction of the detection device (DD) in phase opposition and with a gain which is substantially unitary relative to an angular position of said mechanical support (ET), so as to rapidly compensate for any disturbance in rotation generated by the mechanical support (ET).

15. The system as claimed in claim 13, wherein the means forming a visual servo control loop comprise at least;
said detection device (DD),
a polarity reversing switch (Inv) for an output signal delivered by the detection device (DD);
a nonlinear transfer function (ZSL);
a loop corrector (Cv(p)).

16. The system for visual fixing and fine tracking of a target as claimed in claim 13, wherein said merger means are formed by a subtractor ($S_t$) receiving an output signal delivered by the direct control means and the servo control signal.

* * * * *

UNITED STATES PATENT AND TRADEMARK OFFICE
CERTIFICATE OF CORRECTION

PATENT NO. : 7,667,859 B2
APPLICATION NO. : 11/587163
DATED : February 23, 2010
INVENTOR(S) : Franceschini et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 421 days.

Signed and Sealed this

Twenty-eighth Day of December, 2010

David J. Kappos
*Director of the United States Patent and Trademark Office*